2,806,717
Patented Sept. 17, 1957

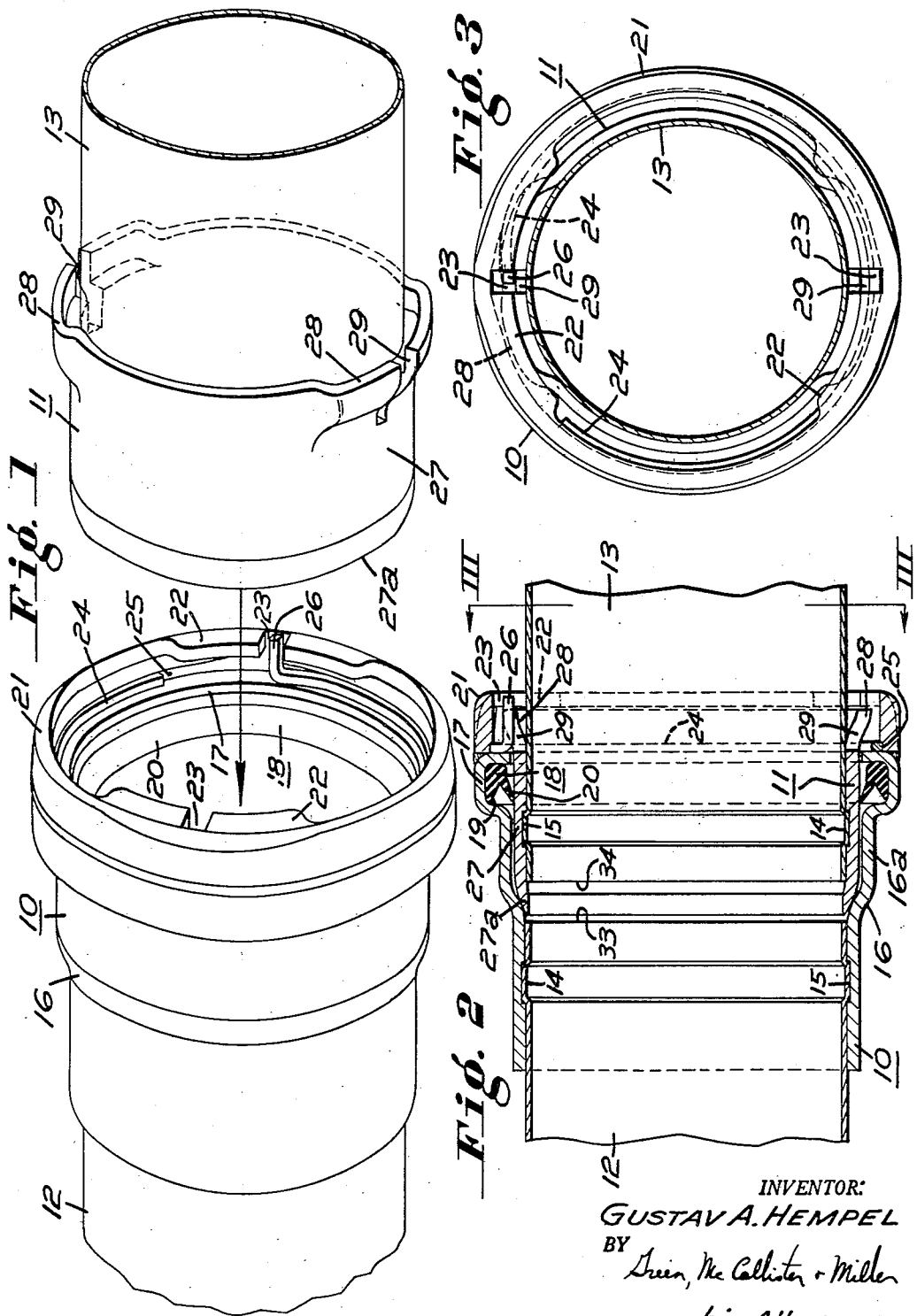

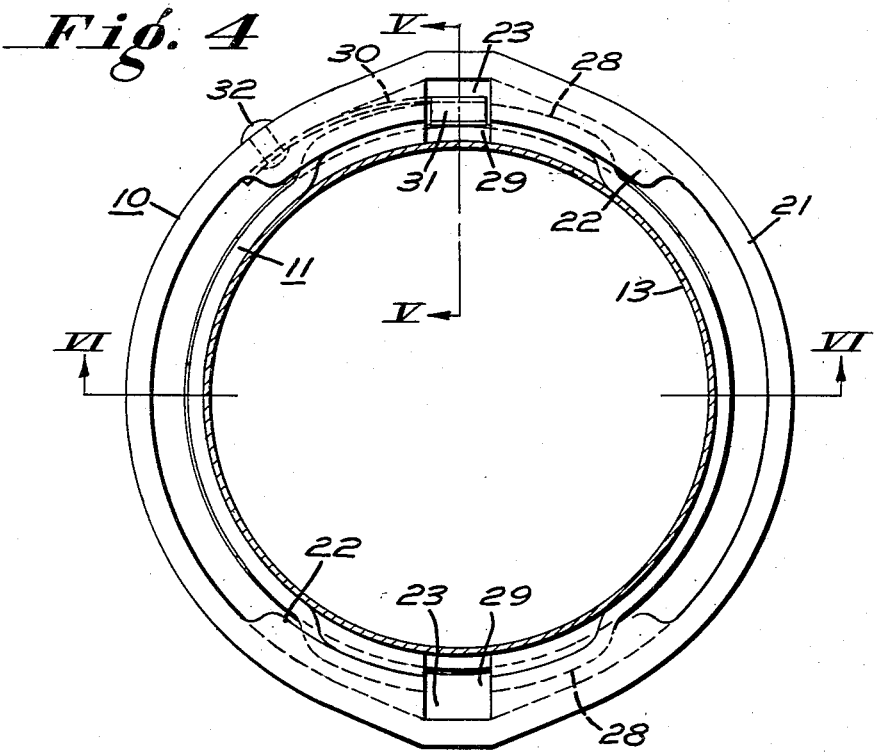
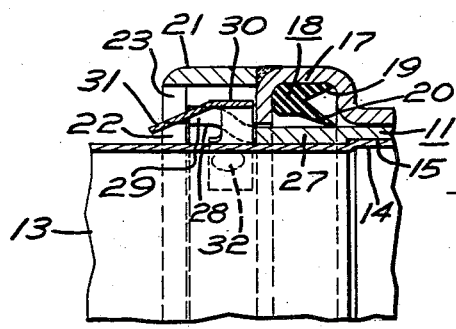
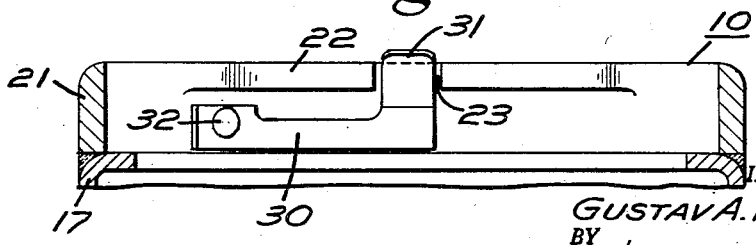

United States Patent Office

2,806,717

ROTATABLY ENGAGEABLE LUGGED PIPE-IN-LOCKET COUPLING WITH AUXILIARY LATCH

Gustav A. Hempel, Pittsburgh, Pa., assignor to McDowell Manufacturing Company, Pittsburgh, Pa., a corporation of Pennsylvania Application May 31, 1955, Serial No. 511,897

3 Claims. (Cl. 285—5)

The present invention relates to a coupling and more particularly to a readily connected and disconnected pipe coupling wherein the pressure of the fluid conducted by the pipe effects the sealing of the coupling.

In many network systems of pipe, such as are used for irrigating purposes, it is necessary to couple main sections to a source of a fluid such as water and to couple branch sections to the main sections in order to establish the desired network system. Such systems are temporary in nature and may be altered from time to time or entirely disassembled. It is therefore very desirable to have a coupling adapted for quick connecting and disconnecting.

Moreover, in joining together the mating parts of many prior couplings the parts are tightly pressed together in a force fit. Not only does this require a longer time to effect the seal, since the joints are more difficult to connect, but more importantly, the joint is more apt to become so distorted by warping, careless handling, and the like that leakage results.

Prior pipe couplings are subject to still other disadvantages. For example, it is customary for many pipe couplings to have a latch or locking member positioned on the outside of the coupling apparatus. This is objectionable since clothing and even a hand of an operator have become caught and damaged on the latch during a coupling or uncoupling operation. Also, when pipe coupled by prior couplings is suspended at its ends, the bending force often at least partially separates the joint of the coupling resulting in an appreciable deflection of the coupled pipe and possible leakage.

The present coupling obviates these objections. My pipe coupling is readily connected and disconnected. Such assembly and disassembly is greatly facilitated by the absence of a force fit. Preferably, I use camming means actuated by initial relative rotary movement between the male and female members of the coupling to limit further rotary movement and to position means for preventing separation of the joint. To provide a fluid seal between the coupling members, I use a gasket disposed in an annular spacing between the telescoped ends of the members. All locking parts of my coupling are stationed within the coupling housing so that there is no protruding external member. Further, the coupling is capable of withstanding a bending force as when coupled pipes or the like are suspended at their free ends, since there is little or no deflection angle between the mating parts of my coupling.

In one form, my coupling includes a female member having an outwardly expanding shoulder portion and an inwardly directed flange provided with a slot. An annular sealing gasket is placed against the sides of this member between the shoulder and the flange. A male member having a nose portion and an outwardly directed camming lug also provided with a slot is freely insertable in the female member in sealing engagement with the gasket to engage the end of the nose portion against the expanding shoulder. This engagement and the annular jacket defined by the expanding shoulder into which the nose portion fits provide a little or no deflection angle between the members.

By rotating the members relatively the camming lug is placed rearwardly of the flange, and cam means stationed in the slot of the flange is actuated by the camming lug to engage the slot of the lug and thereby substantially align the slots of the flange and lug to lock them in an abutting relation and against further relative rotary motion. When fluid pressure is admitted to the couplnig, the gasket prevents leakage between the telescoped ends of the male and female members, and the flange and the lug prevent the members from separating.

The accompanying drawings illustrate a presently preferred embodiment wherein:

Figure 1 is a perspective view of the parts of the coupling prior to their union;

Figure 2 is a center longitudinal section of the parts of Figure 1 when coupled together and is taken through aligned slots in a flange and a lug of these parts to show their relative positions;

Figure 3 is a section of Figure 2 on the line III—III;

Figure 4 is a section similar to Figure 3 illustrating a modified structure;

Figure 5 is a section of Figure 4 on the lines V—V; and

Figure 6 is a section of Figure 4 on the line VI—VI illustrating a fragment of the female coupling member only.

Referring to Figures 1 through 3, the embodiment disclosed includes an annular female member 10 and an annular male member 11, each of which is attached to a pipe 12 and 13, respectively. The attachment may be aided by a raised annular band 14 adjacent the end of each of the pipes which fits into a mating annular recess 15 in the corresponding annular member.

The female member has an outwardly expanding shoulder 16 defining a jacket portion 16a terminating in a trough 17. The trough contains a V-shaped resilient annular gasket 18 having legs 19 and 20 which are directed toward the shoulder 16. An end ring 21 is shown welded to a side of the trough in the illustrated embodiment, but the ring may be made integral with the trough if desired. The end ring has inwardly directed flanges 22 provided with an axially disposed slot 23. A split locking ring 24 seats in an annular recess 25 in the ring 21 and has an end 26 turned axially with respect to the member 10 to enter the slot 23 of a flange 22. The male member 11 has a nose portion 27, provided with a tip 27a, and outwardly directed camming lugs 28, spaced rearwardly of the nose portion, which are also provided with an axially disposed slot 29.

In the embodiment of Figures 4 through 6, the structure is the same except that a locking key 30 replaces the locking ring 24 and recess 25 of the first embodiment. The key 30 is resiliently mounted interiorly and transversely of the female member 10 and has a turned portion 31 disposed in the slot 23 of a flange 22. In this case, the key is fixed to the female member by a rivet 32 and the turned portion 31 is slanted radially inwardly (Figure 5) to react with a camming lug 28 as hereinafter described.

Preferably, both of the lugs 28 are slotted so that either may engage the locking ring 24 in a manner subsequently described, and likewise both of the flanges may be slotted so that either or both may contain a locking member.

In practice, the male member 11 is inserted into the female member with the parts angularly related as shown in Figure 1, that is, with the lugs 28 radially offset with respect to the flanges 22. Upon this insertion, the tip 27a of the nose part 27 impinges against the shoulder 16 and preferably flexes inwardly somewhat to form an initial seal between the annular members. The nose part 27 is housed within the jacket portion 16a with, preferably, very little clearance therebetween. Accordingly, this positioning of the nose tip and nose part of the male member with respect to the shoulder 16, jacket 16a, and trough 17 substantially eliminates any deflection angle between the members, so that the coupling successfully withstands a bending force when pipes or other articles coupled by the present apparatus are suspended at their ends. Simultaneously, leg 20 of the gasket 18 engages the outside of the male member as shown in Figure 2. This insertion also passes the lugs 28 rearwardly of the flanges 22.

The members are next rotated relatively to each other so that the lugs pass behind the flanges. Upon reaching the turned end 26 of the locking ring 24 or the turned portion 31 of the key 30, a lug 28 forces the turned end or turned portion over its camming surface until the slot 29 is reached. The turned end 26 or turned portion 31 then drops into the slot 29 to align the slots 23 and 29 and particularly to place the camming flanges 28 in abutting relation with the rear faces of the flanges 22.

It is emphasized that the union of the annular members as described so far is not a force fit. That is, there is not a fluid tight seal between the flanges 22 and the lugs 28. In this state of zero pressure within the coupling, the gasket 18 does not seriously interfere with relative movement between the two annular members. Accordingly, these members are most freely connected or disconnected at this time. In this regard, the structure described may be used without the gasket 18 as merely latching apparatus when a fluid-tight seal is not necessary.

Upon the admission of fluid to pipe 12 or 13, any leakage past the seal formed by the nose tip 27a and the expanding shoulder 16 is met by the gasket 18 and further leakage thereby prevented. In the preferred form, the gasket is V-shaped. Thus the fluid pressure forces leg 19 against the bottom of the trough 17 and leg 20 against the outside of the male member to prevent fluid from passing further between the members. At the same time, when the fluid pressure acts on opposed ends 33 and 34 of the pipes to urge them apart, the flanges 22 and lugs 28 are pulled together to prevent separation of the coupled members. Preferably, the "play" between the contacting faces of the flanges and lugs is not sufficient to unseat the nose tip 27a from the shoulder 16 when the lugs 28 and flanges 22 are forced together as described. While in use, the ends of the pipe and the nose tip are protected and armored by the housing formed by the female member. Also, it is not critical if the flanges and lugs become distorted from warping or careless handling, since they serve primarily to position the members and prevent longitudinal separation while the gasket effects the fluid seal.

To disconnect the coupling, the pressure in the pipes is preferably at least partially reduced as by bleeding the line at one point. A tool such as tongs or a screwdriver is inserted in a slot 29 to lift radially the turned end 26 or turned portion 31. The coupled members are then turned relatively until the lugs 28 pass from behind the flanges 22 whereupon the members may be pulled apart.

Summarized, my improved coupling construction is employed for detachably connecting end portions of the pair of tubular pipe members 12 and 13. Tubular housing member or part 10 is mounted on and projects axially-forwardly of the end portion of the pipe member 12 and nose member or part 11 is mounted on and projects axially-forwardly of an opposed end portion of the other pipe member 13. The housing member 10 has an open mouth portion to receive the nose part therein.

An annular recess portion 25 which is located axially-forwardly of the annular trough or recess portion 17 for mounting the sealing gasket 18, is positioned about the inner periphery or diameter of the housing member 10 to receive and operatively position the spring-like or resilient locking element such as 24. The arm portion of locking element 24 extends along the recess portion 17 and has a resilient latching finger portion 26 which projects at right angles thereto and axially-forwardly of the coupling.

As shown particularly in Figure 1 of the drawings, the housing member 10 has a pair of diagonally-opposite, radially-inwardly projecting flange lugs 22, at least one of which has a radially-inwardly open slotted portion 23 within which the finger portion 26 is adapted to be aligned for radial spring-like movement therealong. As shown, the flange lugs 22 provide an axial-outer limit side for the recess portion 25. Engagement lugs 28 which project radially-outwardly from the nose part 11, also have a diametrically-opposed relationship with each other and a diameter such that when the nose part is moved axially into position within the housing member 10, that the lugs 28 will be behind and capable of turning movement to a position in abutment behind the flange lugs 22.

At least one of the engagement lugs 28 has a slotted portion 29 which is radially open, both inwardly and outwardly of the construction. Thus, after the nose part 11 has been moved into the housing part 10 and the relative turning movement between the two parts has been initiated, an appropriate one of the engagement lugs 28 acts as a slide cam to flexibly or resiliently press the finger 26 radially-outwardly until it snaps back, radially-inwardly, when, during the relatively turning movement, it aligns in the slotted portion 29. The finger portion 26 thus locks the two members in position against turning movement in either direction.

To release the locked assembly, the finger 26 is manually moved or flexed radially-outwardly within the slotted portion 23 of flange lug 22 until it clears the slotted portion 29 of an adjacent engagement or camming lug 28, so that it may again slide on the surface hump of lug 28. The nose part 11 can be then turned relatively to the housing member until the engagement lugs 28 clear the flange lugs 22. At this time, the members can be moved axially out of position with respect to each other.

I claim:

1. In an improved coupling construction for detachably connecting end portions of a pair of tubular pipe members together, wherein a tubular housing member is mounted on and projects axially-forwardly of an end portion of one pipe member, a nose part is mounted on and projects axially-forwardly of an end portion of the other pipe member, and said housing member has an open mouth portion to receive said nose part therein; an annular recess portion about the inner diameter of said housing member, a pair of diagonally-opposed flange lugs projecting radially-inwardly of said housing member and defining an axial-outer limit side of said recess portion, a spring-like locking element having an arm portion operatively mounted in said recess portion to extend therealong, a radially-inwardly-open slotted portion in at least one of said flange lugs, said locking element having a locking finger portion projecting forwardly from said arm portion at substantially right angles thereto into said slotted portion, said nose part having a pair of diagonally-opposed radially-outwardly-projecting engagement lugs for entry between and axially-behind said flange lugs when said nose part is moved axially-inwardly into a preliminary position within said housing member, at least one of said engagement lugs having a radially-outwardly open slotted portion to receive said locking finger portion radially-inwardly thereof and lock said nose part within said housing member when said nose part is turned from such preliminary position until said engagement lugs are in substantial alignment behind said flange lugs and said latching finger has ridden over the one engagement lug into locking engagement within its slotted portion, and said latching finger portion being released by manually moving it radially-outwardly in the slotted portion of said engagement lug to clear it.

2. In an improved coupling construction for detachably connecting end portions of a pair of tubular pipe members together, wherein a tubular housing part is mounted on and projects axially-forwardly of an end portion of one pipe member, a nose part having a smaller outer diameter than the inner diameter of said housing part is mounted on and projects axially-forwardly of the end portion of the other pipe member, and said housing part has an axially-open mouth to receive said nose part therein; an annular recess portion about the inner diameter of said housing part, a pair of diagonally-opposed flange lugs projecting radially-inwardly of said housing part and defining an axial-outer limit side of said recess portion, a resilient locking element having an arm portion operatively mounted in said recess portion to extend therealong and having a latching finger portion extending substantially at right angles from said arm portion and axially-forwardly of said housing part, a radially-inwardly open slotted portion in each of said flange lugs, said locking element normally resiliently-positioning said locking finger portion in radial alignment within the slotted portion of one of said flange lugs, said nose part having a pair of diagonally-opposed radially-outwardly projecting engagement lugs for axial entry between and behind said flange lugs when said nose part is moved axially-inwardly into a preliminary position within said housing part, each of said engagement lugs having a radially-outwardly open slotted portion to receive said locking finger portion therein; each of said engagement lugs having a camming face to flex said finger portion during relative turning movement of said nose part with respect to said housing part from the above-defined preliminary position, until said engagement lugs are in substantial axial alignment behind said flange lugs, and until said latching finger snaps into the slotted portion of one of said engagement lugs; and said nose part being released from a latched position with respect to said housing part by manually flexing said latching finger radially-outwardly within the slotted portion of one of said flange lugs and out of the slotted portion of said one engagement lug and then, turning said nose part with respect to said housing part until said engagement lugs have moved from their aligned position behind said flange lugs.

3. A coupling construction as defined in claim 2 in which the pipe members are fluid-carrying members, wherein said housing and nose parts define a coupling joint therebetween, a trough portion is positioned about the inner diameter of said housing member axially-behind said recess portion, a V-shaped resilient annular gasket is positioned with its outer peripheral side in operating engagement within said trough portion and with its inner peripheral side positioned to operably engage said nose part when the latter is positioned within said housing part, and said gasket has a pressure chamber open through the coupling joint to fluid flow through the pipe members.

References Cited in the file of this patent

UNITED STATES PATENTS

| | | |
|---|---|---|
| 617,591 | Miller | Jan. 10, 1899 |
| 815,627 | Oldham | Mar. 20, 1906 |
| 1,593,088 | Lowe | July 20, 1926 |
| 2,457,908 | Meyerhoefer | Jan. 4, 1949 |

FOREIGN PATENTS

| | | |
|---|---|---|
| 10,530 | Great Britain | Apr. 28, 1914 |